J. F. ANDERSON.
METHOD FOR EXHAUSTING FOOD CONTAINERS.
APPLICATION FILED JAN. 18, 1922.

1,429,392.

Patented Sept. 19, 1922.
6 SHEETS—SHEET 1.

Inventor
JOHN F. ANDERSON
By Harry C. Schroeder
Attorney

J. F. ANDERSON.
METHOD FOR EXHAUSTING FOOD CONTAINERS.
APPLICATION FILED JAN. 18, 1922.

1,429,392.

Patented Sept. 19, 1922.

Inventor
JOHN F. ANDERSON
By Harry C. Schroeder
Attorney

J. F. ANDERSON.
METHOD FOR EXHAUSTING FOOD CONTAINERS.
APPLICATION FILED JAN. 18, 1922.
1,429,392.
Patented Sept. 19, 1922.
6 SHEETS—SHEET 4.
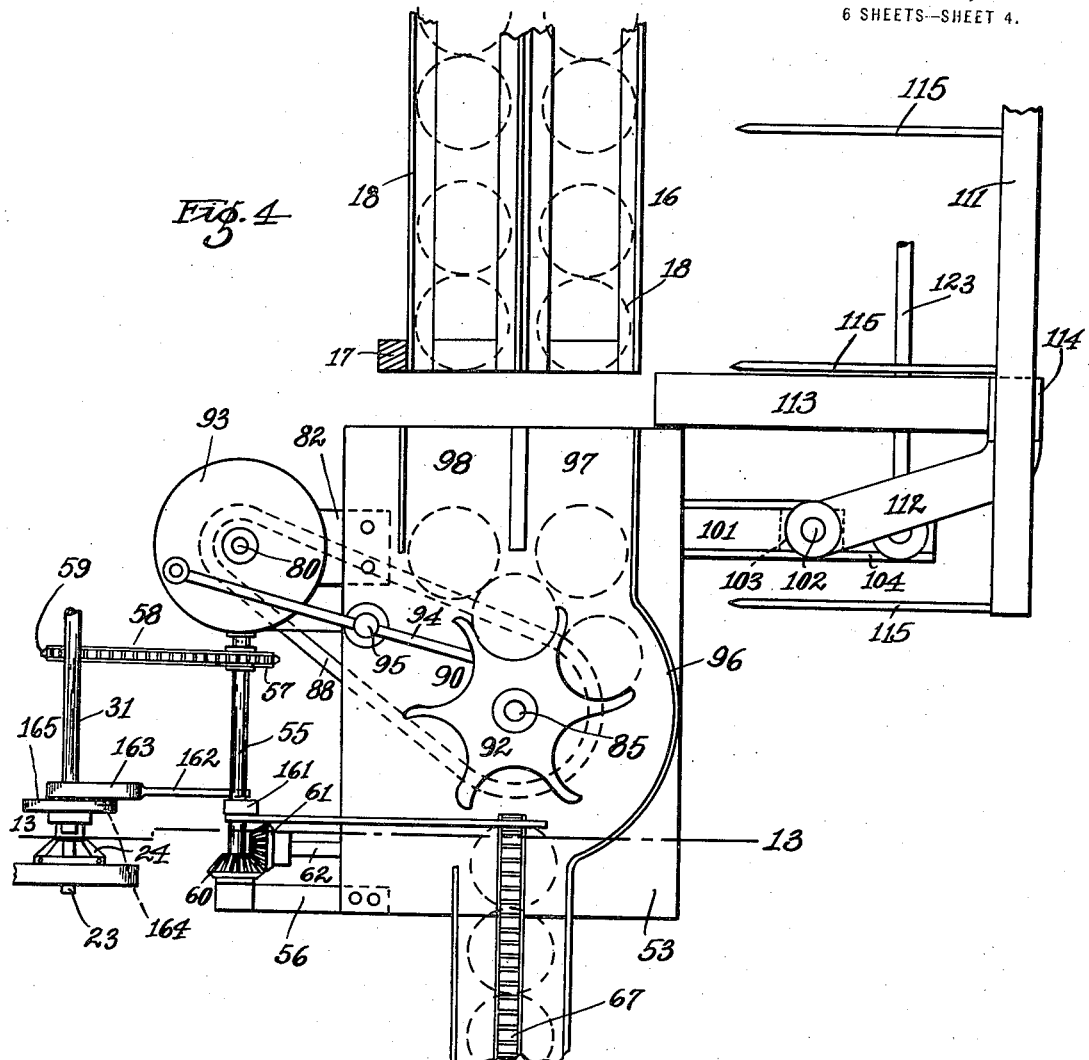
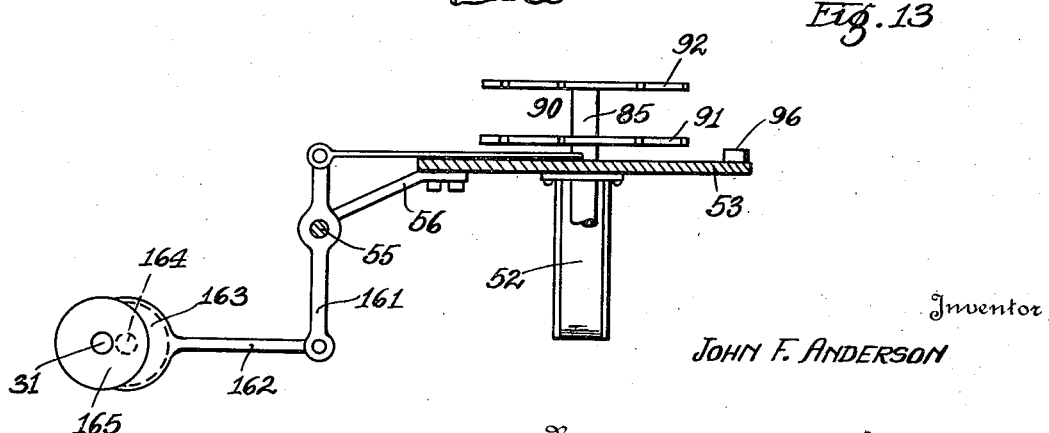
Inventor
JOHN F. ANDERSON
By Harry C. Schroeder
Attorney

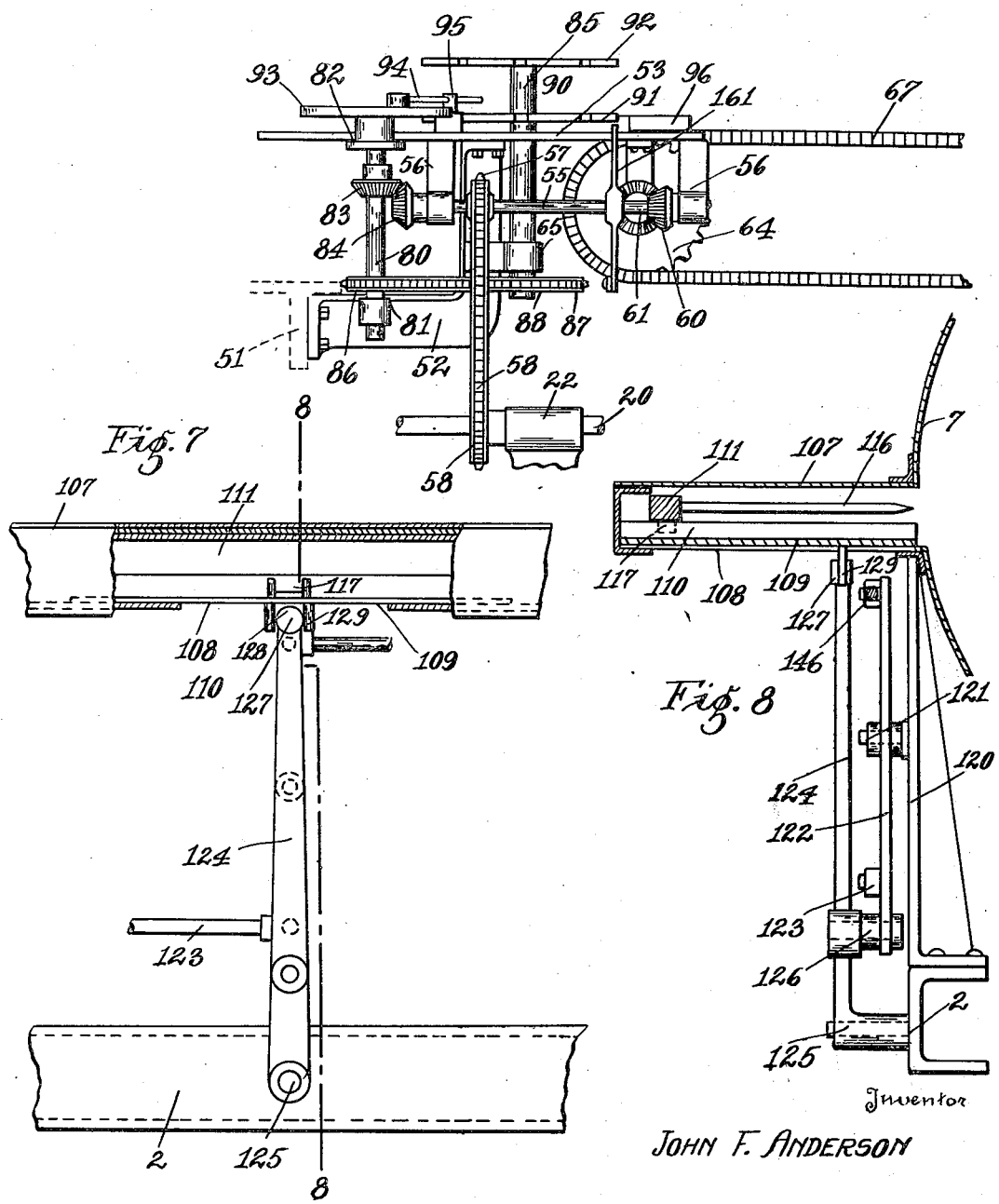

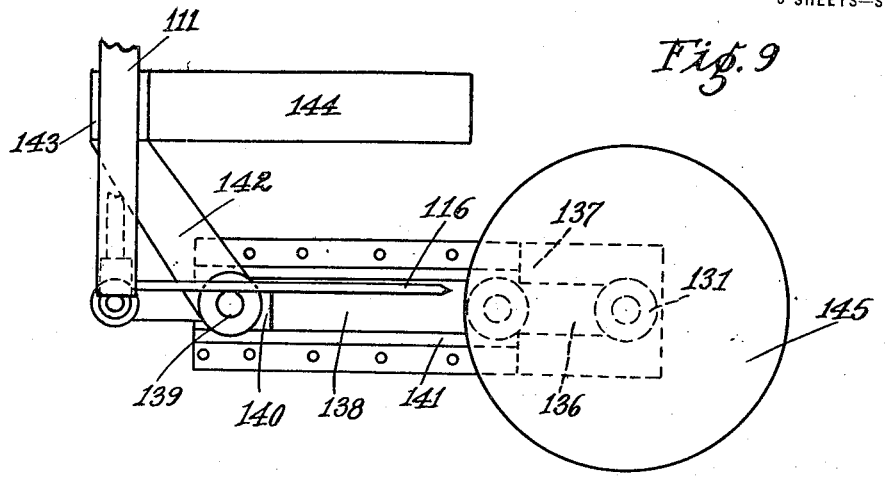
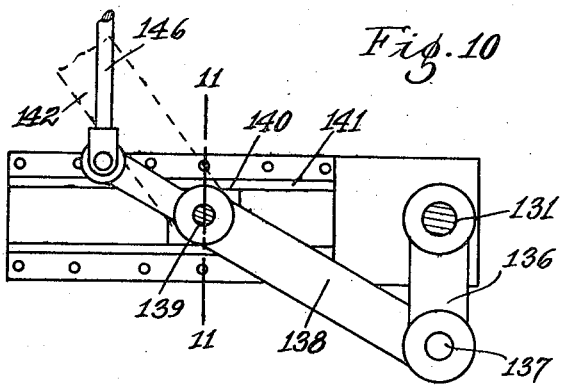
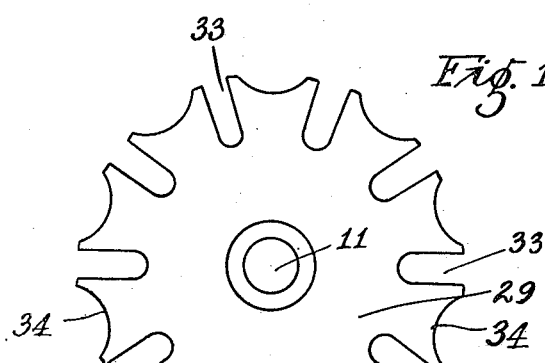
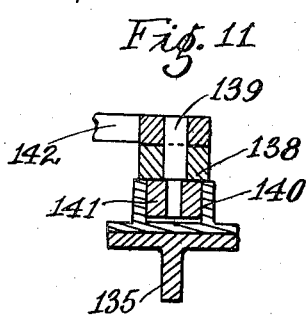
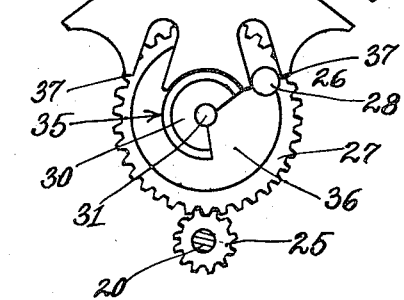

Patented Sept. 19, 1922.

1,429,392

UNITED STATES PATENT OFFICE.

JOHN F ANDERSON, OF OAKLAND, CALIFORNIA.

METHOD FOR EXHAUSTING FOOD CONTAINERS.

Application filed January 18, 1922. Serial No. 530,209.

*To all whom it may concern:*

Be it known that I, JOHN F ANDERSON, a citizen of the United States, residing at Oakland, in the county of Alameda and State of California, have invented certain new and useful Improvements in Methods for Exhausting Food Containers, of which the following is a specification.

My invention is an improved method for sterilizing and exhausting the air from filled containers of fruit or other foods prior to capping and hermetically sealing said containers.

Broadly stated, my invention contemplates conveying or revolving cans or containers about an axis in a chamber and advancing said containers through the chamber in the direction of said axis.

In the practice of my method the whole circular chamber is traversed by the containers, thus giving a more perfect circulation of the steam, heat or fuel. The method consists in advancing or conveying a plurality of containers or cans in vertical position and in a substantially helical path through a chamber and subjecting the cans and the contents thereof to such degree of heat, which is confined and concentrated by the chamber, that the contents will expand or ebullate to the brim of the containers, so as to exhaust all air from the latter, as well as, from the contents itself. By this method, the heat is concentrated in a relatively small space which the container entirely traverses; and, in view of this concentration of heat and the manner in which the containers are advanced therethrough, the containers are thoroughly exhausted of air and their contents thoroughly sterilized, thus exhausting all air and destroying all bacteria which would be detrimental to the preservation of the contents after the containers are sealed.

The air is exhausted more effectively and efficiently from the container and the food or contents thereof more thoroughly sterilized by the present method where the treating or exhausting chamber may be of minimum length which concentrates the heat, and where the material treated is subjected to the treatment for a maximum amount of time resulting in more uniformly exhausting the containers and sterilizing their contents in continuous and larger quantities.

By the term "helical path", referred to above, it is meant the advancing of the containers through the heat chamber in a path having two or more convolutions relative to the general direction of advancement of the containers. Various types of means or apparatus may be employed in carrying out this method, but the method may also be practiced in a more or less manual way, that is, without employing automatic mechanism.

In the accompanying drawings illustrating one type of apparatus by which the method may be practiced—

Figure 4 is a plan view of the intake mechanism of said exhaust box.

Figure 6 is a side elevation of the intake mechanism.

Figure 7 is a fragmentary side view of the cam feed actuating mechanism.

Figure 8 is a vertical view of the cam feed actuating mechanism taken on line 8—8 of Figure 7.

Figure 9 is a plan view of the cam delivery mechanism.

Figure 10 is a view similar to Figure 9 with the parts in a different position.

Figure 11 is a sectional view taken on line 11—11 of Figure 10.

Figure 12 is an end view of the intermittent reel drive gear.

Figure 13 is a cross section of the intake mechanism taken on line 13—13 of Figure 4.

Figure 1:
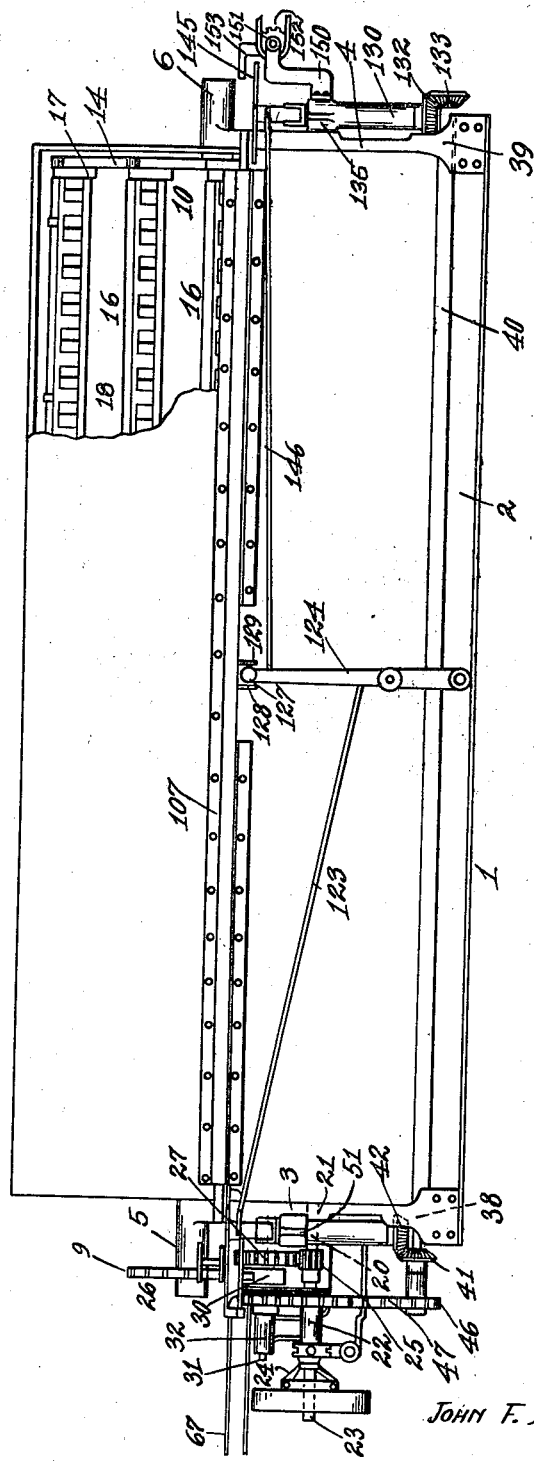
Figure 1 is a side elevation of an exhaust box for practicing my method.
Figure 2:
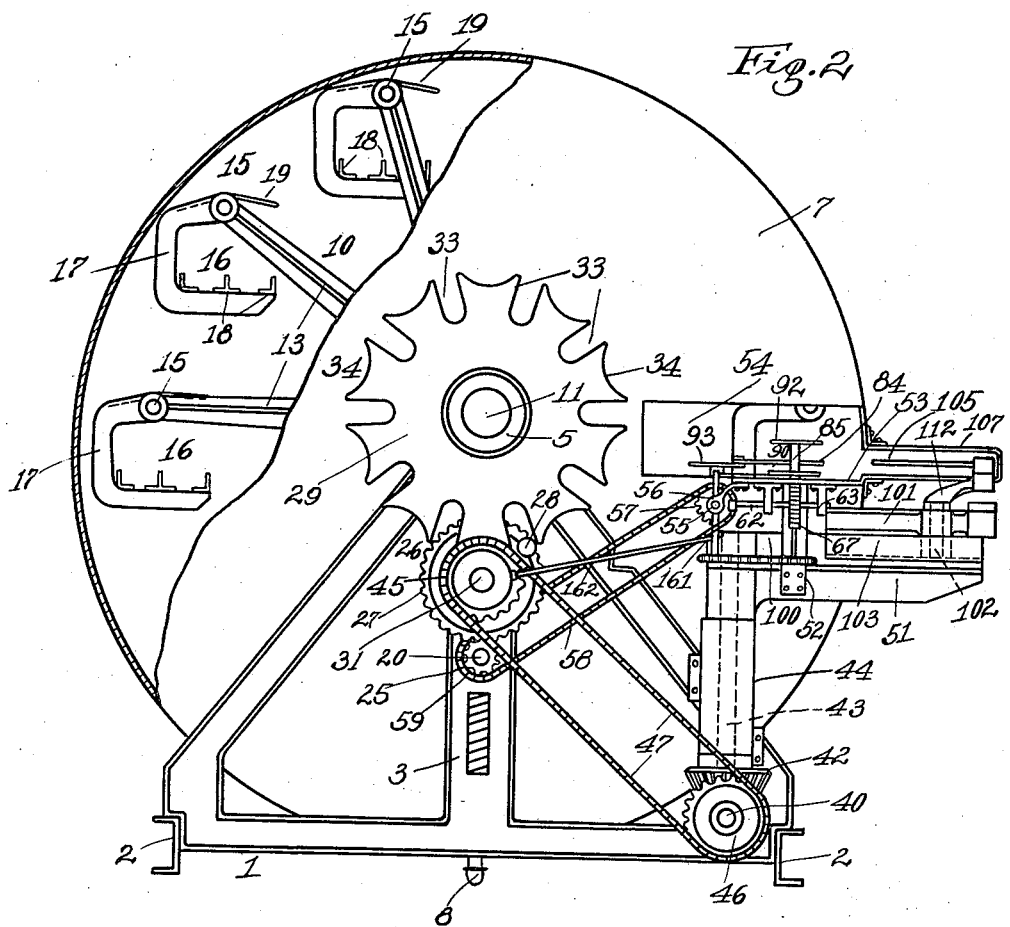
Figure 2 is an end elevation of the intake end of said exhaust box.
Figure 3:
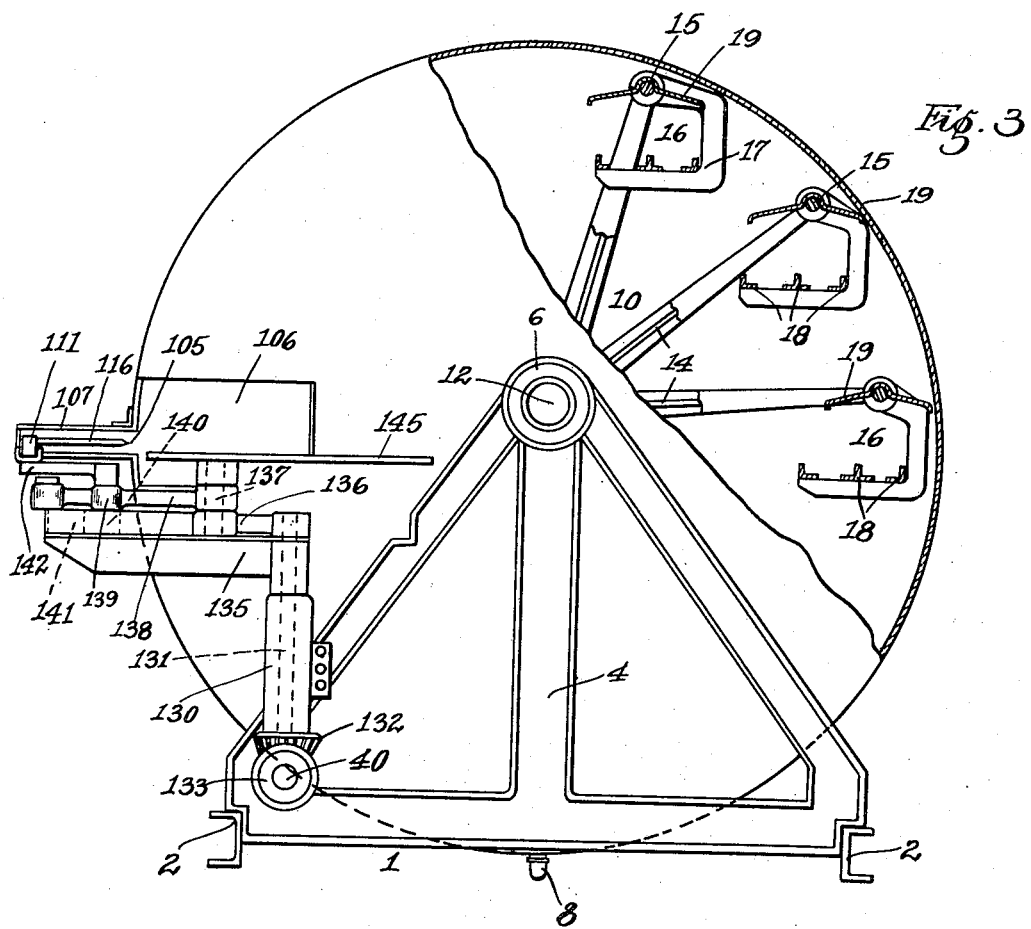
Figure 3 is an end elevation of the delivery end of said exhaust box.
Figure 5:
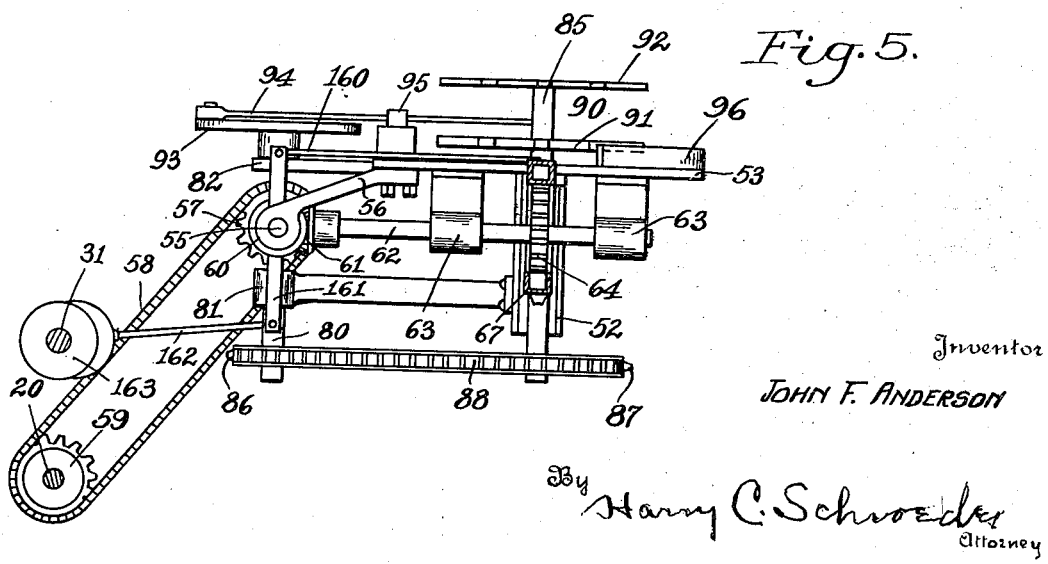
Figure 5 is an end elevation of the intake mechanism of said exhaust box.

The method of this invention is carried out by the machine above referred to in the following manner:—

The reel 10 is intermittently driven by the shaft 23 through the medium of the clutch 24, shaft 20, pinion 25 and intermittent movement 26. The conveyor chain 67 is driven by sprockets 64 from shaft 20 through the medium of sprockets 59 and 57 and chain 58, shaft 55, bevel gears 60 and 61 and shaft 62. The filled cans of fruit or other foods are conveyed by conveyor chain 67 onto the table 53 where the first four cans are successively engaged by the transfer device 90. The arrester bar 160 is then moved by cam 165 into the path of the fifth can and holds said can and the succeeding cans on the conveyor chain 67 while the transfer device 90 transfers the first four cans into position where the first and third cans are first ejected from the device by the ejector 94 into the intake end of the guideways 98 and 97 respectively and then the second and fourth cans are correspondingly ejected from the transfer device into said guideways respectively, the second and fourth cans pushing the first and third cans forwardly in said guideways. The transfer device is driven from shaft 55 through the medium of bevel gears 84 and 83, shaft 80, sprockets 86 and 87, chain 88 and shaft 85. The ejector rod 94 is actuated by the disk 93 which is rotated by the shaft 80. The arrester rod 160 holds back the cans on the conveyor chain 67 until two notches pass the chain and the next notch is brought into registration therewith whereupon the cam 165 withdraws said rod from between the conveyor chain and the transfer device to allow the chain to deliver four more cans to the transfer device. When four cans are transferred into the guideways 97 and 98, the bridge 113 is moved between the inner end of the table 53 and the adjacent end of the chamber 7, and the bridge 144 is moved between the disk 145 and the rear end of the chamber, while the feed bar 111 and its pins 115 are moved inwardly, the pin at the forward end of said bar passing behind the rear cans in said slideways, which operation is effected by means of levers 101 and 138 actuated by cranks 100 and 136, said cranks being rotated from the shaft 31 through the medium of the sprockets 45 and 46 and chain 47, bevel gears 41 and 42 and shaft 43, and bevel gears 133 and 132 and shaft 131. The reel 10 at this period being at rest, the feed bar 111 is moved rearwardly by the lever 124, which is actuated through the medium of lever 122 and rod 123 by the lever 101, and the four cans or the two cans in each of the guideways 97 and 98 are moved by one of the pins 115 at the forward end of the feed bar, across the bridge 113 and into the forward end of the channel bars 18—18 respectively of one of the reel shelves 16. The bridges 113 and 114 are then withdrawn outwardly and the reel rotated until the next shelf 16 is brought into register with table 53, whereupon the next four cans which have been transferred into the guideways 97 and 98 are carried into said shelf as above described. The reel is rotated intermittently and four cans delivered to each succeeding shelf until the first shelf and the first set of cans thereon have rotated a complete revolution and said shaft is again brought into registration with table 53. Another set of cans are then moved onto said first shelf and the pin 115 next to the pin at the forward end of bar 111 engages and pushes the first set of cans forward on the shelf a sufficient distance to make room for the following set. As the reel is rotated the next complete revolution a second set of cans are moved onto the succeeding shelves of the reel, the pin 115 next to the pin at the forward end of the feed bar moving the first set of cans rearwardly on said shelves to make room for the second set. Upon each succeeding revolution of the reel another set of cans is moved onto the shelves and the preceding sets of cans are moved rearwardly on the shelves by the pins 115 between the end pins until the shelves are filled with cans and the foremost sets of cans brought to the rear end of the shelves, whereupon the pin at the rear end of the feed bar engages the foremost sets of cans and successively moves them from the shelves across the bridge 144 which is in its bridging position, onto the rotating disk 145 from which the cans are guided by guide 153 onto the conveyor chain 152 which conveys the cans away from the machine.

While I have shown and described one means by which the method may be practiced, there are various other ways and means by which the same may be carried out, such as for example by the mechanism shown and described in my co-pending applications, Ser. No. 545,778 and Ser. No. 545,779, and I do not limit myself to these or other ways and means by which the method may be practiced, which ways and means fall within the scope of the appended claims.

Having described my invention, I claim:

1. The method of sterilizing and exhausting the air from filled containers of fruit or other substances before said containers are capped and hermetically sealed, which consists in conveying a container or containers in a series of circular paths about an axis in a chamber, and intermittently advancing said container or containers through the chamber in the direction of said axis.

2. A method of sterilizing and exhausting the air from filled containers of fruit or other substances before said containers are capped or hermetically sealed, which consists in advancing one or more vertically positioned containers within a chamber in a direction substantially parallel with an axis and in a successive series of paths about and progressive along said axis, and in subjecting said container and its contents to a heat treatment while in said chamber.

3. The method of sterilizing and exhausting the air from filled containers of fruits or other substances which consists in conveying said containers in vertical position within a heated chamber in circular paths and advancing them two or more times in a direction axially of said circular paths.

In testimony whereof I affix my signature.

JOHN F ANDERSON.